United States Patent
Jeon et al.

(10) Patent No.: US 12,055,528 B2
(45) Date of Patent: Aug. 6, 2024

(54) MICRO-SEPARATOR HAVING STATIONARY PHASE WITH THREE DIMENSIONAL NANO-STRUCTURE AND METHOD FOR MANUFACTURING THE SAME

(71) Applicant: Korea Advanced Institute of Science and Technology, Daejeon (KR)

(72) Inventors: Seokwoo Jeon, Daejeon (KR); Youngsuk Shim, Daejeon (KR); Donghwi Cho, Daejeon (KR); Jade Nadine Ang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 442 days.

(21) Appl. No.: 17/422,781

(22) PCT Filed: Oct. 2, 2019

(86) PCT No.: PCT/KR2019/012905
§ 371 (c)(1),
(2) Date: Jul. 14, 2021

(87) PCT Pub. No.: WO2020/204285
PCT Pub. Date: Oct. 8, 2020

(65) Prior Publication Data
US 2022/0074899 A1 Mar. 10, 2022

(30) Foreign Application Priority Data
Apr. 2, 2019 (KR) .......................... 10-2019-0038525

(51) Int. Cl.
*G01N 30/52* (2006.01)
*B01D 15/20* (2006.01)
(Continued)

(52) U.S. Cl.
CPC ............. *G01N 30/52* (2013.01); *B01D 15/20* (2013.01); *G01N 30/6095* (2013.01);
(Continued)

(58) Field of Classification Search
CPC ............... G01N 30/52; G01N 30/6095; G01N 2030/025; G01N 2030/521; G01N 2030/525; B01D 15/20
(Continued)

(56) References Cited

U.S. PATENT DOCUMENTS

| | | | |
|---|---|---|---|
| 6,454,840 B1 * | 9/2002 | Gellert | G01N 30/6095 95/82 |
| 2011/0108522 A1 * | 5/2011 | Rozing | G01N 30/6095 264/293 |
| 2014/0349085 A1 | 11/2014 | Jeon et al. | |

FOREIGN PATENT DOCUMENTS

| | | |
|---|---|---|
| EP | 3 444 028 A1 | 2/2019 |
| JP | 2007-523468 A | 8/2007 |

(Continued)

OTHER PUBLICATIONS

Haudebourg et al., "Temperature-Programmed Sputtered Micromachined Gas Chromatography cols. An Approach to Fast Separations in Oil eld Applications", Analytical Chemistry, Nov. 20, 2012, vol. 85, pp. 114-120; 7 Pages.
(Continued)

*Primary Examiner* — Fred Prince
(74) *Attorney, Agent, or Firm* — DALY, CROWLEY, MOFFORD & DURKEE, LLP

(57) ABSTRACT

A disclosed micro-separator for gas chromatography includes a base substrate having a trench, a channel column disposed in the trench, and a cover member combined with the base substrate and covering the channel column. The
(Continued)

channel column includes a stationary phase having pores ordered and three-dimensionally connected to each other.

5 Claims, 7 Drawing Sheets

(51) Int. Cl.
    *G01N 30/60*      (2006.01)
    *G01N 30/02*      (2006.01)

(52) U.S. Cl.
    CPC . *G01N 2030/025* (2013.01); *G01N 2030/521* (2013.01); *G01N 2030/525* (2013.01)

(58) Field of Classification Search
    USPC ......... 210/198.2, 656, 657, 658, 659; 95/82, 95/88; 96/101, 102
    See application file for complete search history.

(56) References Cited

FOREIGN PATENT DOCUMENTS

| | | |
|---|---|---|
| JP | 2008-241543 A | 10/2008 |
| JP | 2013-504669 A | 2/2013 |
| JP | 2019-034298 A | 3/2019 |
| KR | 20060109477 A | 10/2006 |
| KR | 101391730 B1 | 5/2014 |
| KR | 101401342 B1 | 5/2014 |
| KR | 101699454 B1 | 1/2017 |
| KR | 20180057357 A | 5/2018 |

OTHER PUBLICATIONS

Kim et al., "Microfabricated Gas Chromatograph for On-Site Determniation of Trichlotoethylene in Indoor Air Arising from Vapor Intrusion. 1. Field Evaluation", Environmental Science & Technology, Apr. 30, 2012, vol. 46, pp. 6065-6072; 8 Pages, www.pubs.acs.org/est/dx.doi.org/10.1021/es204624z.

Kuo et al., "Development of Micromachined Preconcentrators and Gas Chromatographic Separation Columns by an Electroless Gold Plating Technology", Journal of Micromechanics and Microengineering, Feb. 8, 2017, vol. 27; 13 Pages.

Nakai et al., "Micro-fabricated Semi-Packed Column for Gas Chromatography by using Functionalized Parylene as a Stationary Phase", Journal of Micromechanics and Microengineering, May 22, 2009, vol. 19; 7 Pages.

Rankin et al., "The Development of a Disposable Gas Chromatography Microcolumn", Chem. Communication, Jan. 27, 2015, vol. 51; 5 Pages—https://www.rsc.org/chemcomm/doi.10.1039/c4cc09915j.

Regmi et al., "Micro Gas Chromatography: An Overview of Critical Components and Their Integration", Analytical Chemistry, Oct. 25, 2018, vol. 90, pp. 13133-13150; 18 Pages.

Siritham et al., "A Preconcentrator-Separator Two-in-One Online System for Polycyclic Aromatic Hydrocarbons Analysis", Talanta, Feb. 20, 2017, pp. 573-582; 10 Pages, https://wwwelsevier.com/locate/talanta/dx.doi.org/10.1016/j.talanta.2017.02.035.

Vial et al., Silica Sputtering as a Novel Collective Stationary Phase Deposition for Microelectomechanical System Gas Chromatography Column: Feasibility and First Separations, Journal of Chromatography A, Dec. 21, 2010, vol. 1218, pp. 3262-3266; 5 Pages.

Japanese Notice of Reasons for Refusal (with English Translation) for Japanese Application No. 2021-541614; 9 Pages , Jul. 2022.

\* cited by examiner

[FIG. 1]
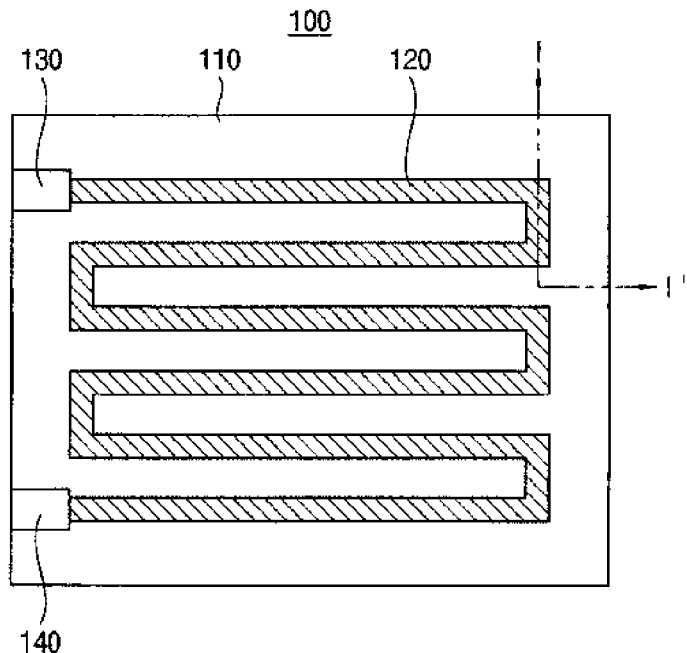
[FIG. 2]
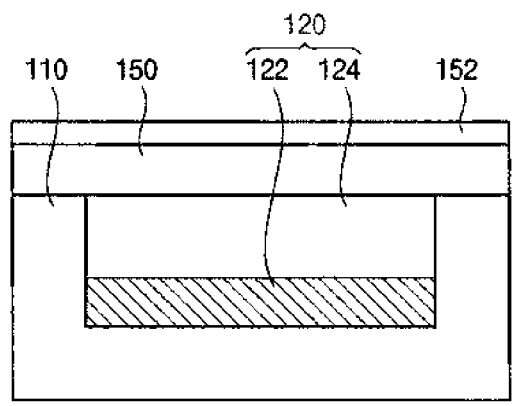
FIG. 3
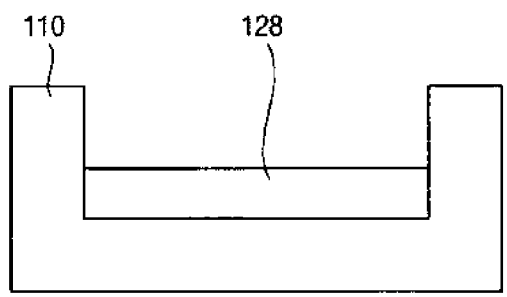

MICRO-SEPARATOR HAVING STATIONARY PHASE WITH THREE DIMENSIONAL NANO-STRUCTURE AND METHOD FOR MANUFACTURING THE SAME

CROSS-REFERENCE TO RELATED APPLICATION

This application is a U.S. National Stage Application of International application No. PCT/KR2019/012905 filed on Oct. 2, 2019. This U.S. non-provisional application claims priorities under 35 USC § 119 from Korean Patent Application No. 10-2019-0038525 filed on Apr. 2, 2019 in the Korean Intellectual Property Office (KIPO), the disclosures of which are hereby incorporated by reference in their entirety.

TECHNICAL FIELD

The invention relates to a micro-separator for gas chromatography. More particularly, the invention relates to a micro-separator having a stationary phase with a three-dimensional nano-structure for gas chromatography, and method for manufacturing the same.

BACKGROUND

Gas chromatography (GC) is an analysis method in which a sample (analyte) is carried by a carrier gas and passes through a column to separate mixed components into a single component. The GC system consists of a carrier gas, an inlet, a material separator column, an oven, a detector, and a data system, and the performance of the material separator column may be an important factor in determining the overall system performance.

In a material separator column, chemical equilibrium, adsorption and distribution, which are different from those of a stationary phase, are caused in gaseous sample loaded in the carrier gas (mobile phase) due to difference in chemical properties between the gaseous sample and the stationary phase coated in the column, thereby creating a time difference when they passes through the column. Thus, materials are separated.

In general, as a material separator column, a packed column or a capillary column is used. The packed column consists of an inert material, a solid support that is generally formed of a diatomaceous earth material, and a coated liquid stationary phase. The packed column may have a relatively large diameter and a relatively short length, approximately 2-4 mm of an inner diameter and 1.5-10 m of a length, since an inside of a tube is entirely filled. The capillary column can be divided into a Wall Coated Open Tubular (WCOT) column coated with a liquid stationary phase, and a Porous Layer Open Tubular (PLOT) column in which a solid porous material having a thin film stationary phase is coated on an inner wall. Typical stationary phase materials used for detection of gaseous samples may include polysiloxane (PE-1, PE-5, etc.), polyethlylene glycols (PE-Wax, FFAP (trade name)), polydimethylsiloxane (PDMS), silica nanoparticles and the like. In the capillary column, since the stationary phase is coated on an inner wall of a tube, it may have a narrower diameter (within 1 mm) and a longer length (several tens of meters) compared to the packed column in order to increase probability for collision of gaseous samples.

Conventional GC systems have advantages of superior reliability and superior separation efficiency compared to other separation systems. However, they have a large volume of m 3 level due to a long column of several meters, an oven to maintain a proper temperature of the column, and a signal processing system. Therefore, they have an intrinsic difficulty in being applied for precise analysis of unknown samples collected at scenes of incident, such as explosives and drugs. In order to overcome the above problems, studies on u-Gas Chromatography (u-GC) using Microelectromechanical Systems (MEMS) technology have been recently reported. For example, a semi-packed column with a rectangular columnar array within a sputtered open tubular column has been demonstrated to be able to separate short hydrocarbons and natural gas (J. Vial et al., "Silica sputtering as a novel collective stationary phase deposition for microelectromechanical system gas chromatography column: Feasibility and first separations", J. Chromatogr. A 1218, 3262-3266, 2011). As another example, it was successful to separate saturated and unsaturated hydrocarbon chains using silica or graphite sputtered microcolumns with metal filaments for temperature programming (R. Haudebourg et al. "Temperature-Programmed Sputtered Micromachined Gas Chromatography Columns: An Approach to Fast Separations in Oilfield Applications", Anal. Chem. 85, 114-120, 2013). In addition, possibility for practical application of micro-GC was suggested by integrating ZIF-8-PVA cryogel in a laser-etched acrylic micro-separator column to separate a polycyclic aromatic hydrocarbon (C. Siritham et al. "A preconcentrator-separator"). two-in-one online system for polycyclic aromatic hydrocarbons analysis", Talanta 167, 573-582, 2017).

However, the material separators according to the conventional researches have a small reaction specific surface area with most gaseous samples, and non-uniform accumulation occurs when silica nanoparticles or the like are used. As a result, deterioration of separation performance such as asymmetric peaks for light and left, peak broadening, tailing effect or the like occurs due to material problem. Thus, they are hardly used for practical appliance.

PATENT LITERATURE (1) Korean Patent Application 10-2015-0100209

NON-PATENT LITERATURE (1) Micromech. Microeng. 2009, 19, 065032
(2) Micromech. Microeng. 2017, 27, 035012
(3) Environ. Sci. Technol. 2012, 46, 6065
(4) Chem. Commun., 2015, 51, 8920
(5) Anal. Chem. 2013, 85, 114
(6) Anal. Chem. 2018, 90, 13133

DETAILED DESCRIPTION OF THE INVENTION

Technical Problem to be Solved

One object of the invention is to provide a micro-separator having a stationary phase with a three-dimensional nano-structure for gas chromatography by integrating a three-dimensional nano-structure in a micro-column for a material separator and using it as a stationary phase in order to overcome intrinsic technical limitation of conventional gas chromatography systems.

Another object of the invention is to provide a method of manufacturing the micro-separator having a stationary phase with a three-dimensional nano-structure for gas chromatography.

The invention may, however, be embodied in many different forms and should not be construed as limited to the embodiments set forth herein.

Means for Solving Problem

According to example embodiments to accomplish the objectives of the present invention, a micro-separator for gas chromatography includes a base substrate having a trench, a channel column disposed in the trench, and a cover member combined with the base substrate and covering the channel column. The channel column includes a stationary phase having pores ordered and three-dimensionally connected to each other.

In an example embodiment, the base substrate includes at least one selected from the group consisting of silicon, glass, quartz, sapphire and a polymer.

In an example embodiment, the stationary phase includes at least one selected from the group consisting of a polymer, a metal and a ceramic.

In an example embodiment, the stationary phase is disposed on a bottom surface of the trench and is spaced apart from the cover member to define a gas flow path.

In an example embodiment, the stationary phase includes a lower stationary phase disposed on a bottom surface of the trench, and an upper stationary phase combined with a lower surface of the cover member. At least a portion of the upper stationary phase is spaced apart from the lower stationary phase to define a gas flow path between the lower stationary phase and the upper stationary phase.

In an example embodiment, the stationary phase entirely fills the channel column.

In an example embodiment, a bottom surface of the trench has a concave shape, and the stationary phase has an upper surface recessing along the bottom surface of the trench.

According to an example embodiment, a gas chromatography system includes a micro-separator, a pre-concentrator providing a concentrated sample to the micro-separator, and a sensor detecting a kind or a content of the sample separated by the micro-separator.

According to an example embodiment, a method for manufacturing a micro-separator for gas chromatography includes forming a photosensitive film in a trench of a base substrate, providing a three-dimensionally distributed light by using a phase mask to expose the photosensitive film to a light, and developing the light-exposed photosensitive film to form a polymeric stationary phase of a three-dimensional nano-structure having pores ordered and connected to each other.

In an example embodiment, the phase mask is disposed on a lower surface of the base substrate.

In an example embodiment, an optical medium member is provided on the photosensitive film, and the phase mask is disposed on the optical medium member.

In an example embodiment, at least a portion of the optical medium member is disposed in the trench, and the optical medium member includes at least one selected from the group consisting of a lubricant for matching a refractivity, glass, PDMS (polydimetyl siloxane), PUA (polyurethane acrylate) and PFPE (perfluoropolyether).

In an example embodiment, the method for manufacturing a micro-separator for gas chromatography further includes forming a substituted stationary phase filling at least a portion of the pores of the polymeric stationary phase and including a metal or a ceramic, and removing the polymeric stationary phase.

In an example embodiment, the method for manufacturing a micro-separator for gas chromatography further includes forming an upper stationary phase on a surface of the cover member, the upper stationary phase having a three-dimensional nano-structure having pores ordered and connected to each other, and combining the cover member with the base substrate such that the upper stationary phase is inserted into the trench of the base substrate.

Effects of the Invention

According to the above-explained embodiments of the present invention, a stationary phase of a micro-separator may have a three-dimensional network structure in which nano-scaled pores are three-dimensionally connected to each other and are arranged with a periodicity. Thus, efficient mass transfer is possible in the structure, and a surface area of the structure may be maximized. Thus, separation performance of the separator may be increased. Thus, the separator may have performance equal to or greater than a conventional large-size separator even with a shorter column. Thus, the separator may be miniaturized to a portable level. A gas chromatography system, which is usable at various placed requiring for a rapid feedback, may be implemented.

Furthermore, since the separator has a three-dimensional ordered porous structure that is proper for surface reaction of the gaseous sample and the stationary phase, the number of absorbed/separated molecules may be increased by 10 times to 1,000 times compared to a conventional non-ordered porous body with micron level, due to increased specific surface area. This may increase detection limitation by 10 times to 100,000 times. Thus, when separated sample may be detected by a sensor, a peak intensity, a peak sharpness and a resolution may be increased. Furthermore, since a length of a channel column is reduced, additional heating for inducing surface reaction may be omitted so that separation may be possible at a low temperature. Thus, power consumption may be reduced, and an entire process for fabricating a system may be simplified. Thus, there is a great merit in view of mass-production.

Furthermore, selectivity for samples and physical characteristic such as a heat resistance may be increased through a material substitution of the stationary phase.

BRIEF DESCRIPTION OF THE DRAWINGS

FIG. 1 is a plan view illustrating a micro-separator for gas chromatography according to an example embodiment of the invention.

FIG. 2 is a cross-sectional view taken along the line of I-I' in FIG. 1.

FIGS. 3 to 6 are cross-sectional views illustrating a method of manufacturing a micro-separator for gas chromatography according to an example embodiment of the invention.

BEST EMBODIMENT FOR IMPLEMENTING THE INVENTION

Figure 4:
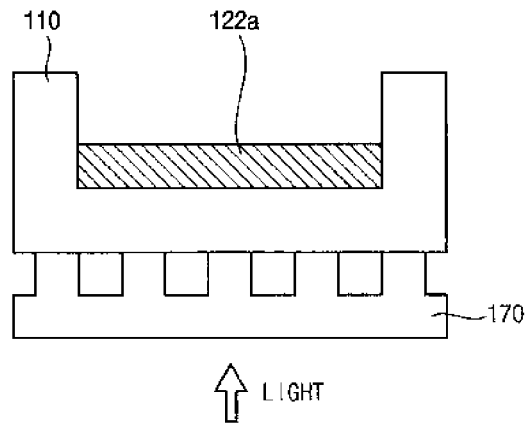

A micro-separator for gas chromatography and a method for the same according to embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein FIG. 1 is a plan view illustrating a micro-separator for gas chromatography according to an example embodiment of the invention. FIG. 2 is a cross-sectional view taken along the line of I-I' in FIG. 1.

Referring to FIGS. 1 and 2, the micro-separator 100 for gas chromatography according to the invention includes a channel column 120. The channel column 120 may have various shapes and lengths depending on a purpose, a separation target or the like, of the micro-separator 100. For example, the channel column 120 may have a spiral shape, a radial shape or the like as well as a zigzag shape illustrated in FIG. 1. For example, a length of the channel column 120 may be several centimeters to several tens of meters. Furthermore, a width of the channel column 120 may be 200 to 1,000 μm, and a depth of the channel column 120 may be 100 to 500 μm.

The micro-separator 100 includes a base substrate 110. A trench for forming a space for the channel column 120 may be formed along a surface of the base substrate 110. Both ends of the channel column 120 may be connected to an inlet 130 to which a gaseous sample is injected, and an outlet 140 from which a separated gaseous sample is discharged, respectively.

For example, the base substrate 110 may include silicon, glass, quartz, sapphire, a polymer, a metal or the like. For example, the polymer may include PMMA (polymethyl methacrylate), PET (polyethyleneterephthalate), PC (polycarbonate), PI (polyimide), PA (polyamide), PP (polypropylene) or the like.

The channel column 120 includes a stationary phase 122. In an example embodiment, the micro-separator 100 may be a capillary column type. The channel column 120 with a capillary column type may have an empty space in which the stationary phase 122 is not disposed, and the empty space may be defined as a gas flow path 124.

In an example embodiment, the stationary phase 122 may have a three-dimensional porous nano-structure. Preferably, the stationary phase 122 may have pores that are ordered and three-dimensionally connected to each other. The stationary phase 122 may include various materials such as metal, ceramic, semiconductor, organic compounds or the like. For example, the stationary phase 122 may include cerium oxide ($CeO_2$), aluminum oxide ($Al_2O_3$), titanium oxide ($TiO_2$), zirconium oxide ($ZrO_2$), zinc oxide (ZnO), titanium nitride (TiN), or a combination thereof. In another example embodiment, the stationary phase 122 may include gold, silver, platinum, palladium, ruthenium, rhodium, iridium, vanadium, nickel, cobalt, copper, tungsten, molybdenum, manganese, aluminum, iron, or a combination thereof. For example, the polymer may include an epoxy resin, an acrylic resin, a phenol resin or the like, which may be cross-linked. However, a material for a stationary phase, which may be used for the invention, is not limited thereto, and various materials may be used depending on a separation target or the like.

In an example embodiment, the micro-separator 100 may further include a cover member 150 combined with the base substrate 110 and covering the channel column 129.

In an example embodiment, the micro-separator 100 may further include a heating member 152. The heating member 152 may include a metal with a high thermal conductivity such as copper, aluminum, nickel, silver or the like. For example, the heating member 152 may adjust or maintain a temperature in a channel column 120 through Joule heating.

In an example embodiment, the heating member 152 may be combined with an upper surface of the cover member 150. However, example embodiments of the invention are not limited thereto. The heating member 152 may be combined with a lower surface of the cover member 150, or combined with a lower surface or a side surface of the base substrate 110. Furthermore, the heating member 152 may be omitted.

In an example embodiment, the stationary phase 122 may have a three-dimensional network structure in which nano-scaled pores are three-dimensionally connected to each other and are arranged with a periodicity. Thus, efficient mass transfer is possible in the structure, and a surface area of the structure may be maximized. Thus, separation performance of the separator may be increased. Thus, the separator may have performance equal to or greater than a conventional large-size separator even with a shorter column. Thus, the separator may be miniaturized to a portable level.

Furthermore, since the separator has a three-dimensional ordered porous structure that is proper for surface reaction of the gaseous sample and the stationary phase, the number of absorbed/separated molecules may be increased by 10 times to 1,000 times compared to a conventional non-ordered porous body with micron level, due to increased specific surface area. This may increase detection limitation by 10 times to 100,000 times. Thus, when separated sample may be detected by a sensor, a peak intensity, a peak sharpness and a resolution may be increased. Furthermore, since a length of a channel column is reduced, additional heating for inducing surface reaction may be omitted so that separation may be possible at a low temperature. Thus, power consumption may be reduced, and an entire process for fabricating a system may be simplified. Thus, there is a great merit in view of mass-production.

Figure 7:
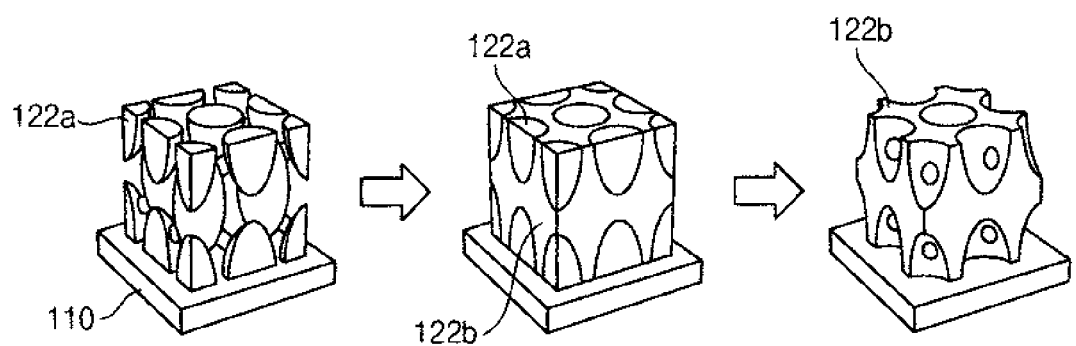
FIG. 7 is a perspective view illustrating a step for substituting a material for a stationary phase in a method of manufacturing a micro-separator for gas chromatography according to an example embodiment of the invention.

FIGS. 3 to 6 are cross-sectional views illustrating a method of manufacturing a micro-separator for gas chromatography according to an example embodiment of the invention. FIG. 7 is a perspective view illustrating a step for substituting a material for a stationary phase in a method of manufacturing a micro-separator for gas chromatography according to an example embodiment of the invention.

In order to form a stationary phase with a three-dimensional nano-structure according to an example embodiment of the invention, various methods such as self-assembly, interference lithography, stereo lithography, holographic lithography, direct ink writing, 3D printing or the like may be used. Disclosures of Korean Patent Application Nos. 2018-0041150 and 2016-0116160 and Korean Granted Patent 1391730, 1400363, 1358988, 19119906 and 1902382 may be incorporated herein for reference in order to explain a method of forming a stationary phase with a three-dimensional nano-structure.

Hereinafter, an example embodiment using proximity-field nano-patterning (PnP) will be explained.

Referring to FIG. 3, a photosensitive film 128 is formed in a trench of a base substrate 110. The trench may be formed by various methods. For example, deep reactive ion etching (DRIE), LIGA (Lithographie, Galvano-formung, and Abformung) or the like.

The photosensitive film 128 may be formed by soft-baking a photosensitive composition, for example, at a temperature range of about 50° C. to about 100° C. after the photosensitive composition is provided in the trench. Time for baking may be properly adjusted, for example, may be about 5 minutes to 3 hours.

For example, the photosensitive composition for forming the photosensitive film 128 may include an organic-inorganic hybrid material, a hydrogel, a phenol resin, an epoxy resin or the like, which is cross-likable in response to a light. Particularly, examples of the photosensitive composition may include a photoresist such as SU-9 series, KMPR series, ma-N 1400, which are provided by MicroChem, or the like.

Various methods may be used for providing the photosensitive composition in the trench. In view of a width of the channel, a method of flowing the photosensitive composition through a micro-pipette or a syringe may be preferably used.

Figure 5:
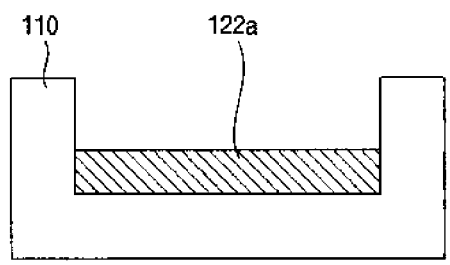
Figure 6:
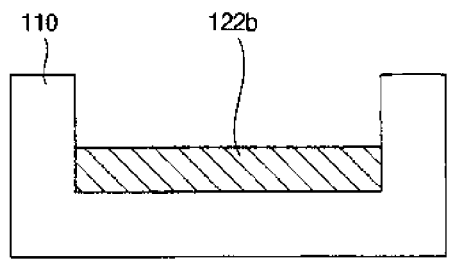

Referring to FIGS. 4 and 5, a PnP process is performed to form a polymeric stationary phase 122a. In an example embodiment, a phase mask 170 may contact a lower face of the base substrate 110, and then a three-dimensionally distributed light may be irradiated onto the photosensitive film 128 through the phase mask 170 and the base substrate 110.

In the PnP process, the photosensitive film 128 may be patterned, for example, by using a periodic three-dimensional distribution of light generated from interference of light passing through a phase mask including an elastomer material. For example, when the flexible elastomer-based phase mask 170 having a concave and convex grid structure on a surface thereof may contact the base substrate 110, the phase mask 170 may be adhered (for example, conformal-contact) to the base substrate 110 spontaneously due to Van der Waals force.

When a laser having a range of wavelengths similar to a grating period of the phase mask 170 is irradiated onto the surface of the phase mask 170, the three-dimensional distribution of light may be formed by Talbot effect. When the negative-tone photoresist is used, cross linking may be generated at portions of the photoresist on which light is strongly irradiated due to the constructive interference of light, whereas other portions of the photoresist on which light is weakly irradiated may be dissolved and removed in a developing process because of the insufficient exposure dose of light. After a final drying process, a porous polymeric material may be obtained, which may contain periodic three-dimensional structures of several hundreds nanometers (nm) to several micrometers (μm) depending on a wavelength of the laser and a design of the phase mask.

In an example embodiment, pore size and periodicity of the polymeric stationary phase 122a may be adjusted by controlling a pattern period of the phase mask 170 and the wavelength of incident light in the PnP process.

For example, the phase mask 170 used in the PnP process may include PDMS (polydimetyl siloxane), PUA (polyurethane acrylate), PEPE (perfluoropolyether) or the like.

For example, i-line (365 nm) light source may be used for light exposure, and exposing dose energy may be 10 to 30 mJ/cm$^2$ depending on a thickness of a light-exposed layer.

For example, the light-exposed photosensitive film 128 may be baked at a temperature range of about 50° C. to about 100° C. Time for baking may be properly adjusted, for example, may be about 5 minutes to 3 hours.

For example, when the photosensitive film 128 includes a negative-tone photoresist, a light-exposed portion of the photosensitive film 128 may remain while a non-exposed portion thereof may be removed by a developing solution. As a result, the polymeric stationary phase 122a including three-dimensional nano-pores may be formed.

Examples of the developing solution may include, for example, PGMEA (propylene glycol monomethyl ether acetate), ethyl lactate, diacetone alcohol, TMAH (tetramethylammonium hydroxide), a developer for Su-8 or the like. Furthermore, an alcohol such as ethanol, isopropyl alcohol or the like may be used for rinsing.

In an example embodiment, the polymeric stationary phase 122a may have a three-dimensional network structure in which nano-scaled pores in a range of about 1 nm to about 2,000 nm are three-dimensionally connected to each other and arranged to have periodicity.

In an example embodiment, the polymeric stationary phase 122a may be used as a stationary phase for separation. However, the polymeric stationary phase 122a may be used as a template for material substitution. For example, referring to FIGS. 6 and 7, at least a portion of the pores of the polymeric stationary phase 122a may be filled to form a substituted stationary phase 122b, and then the polymeric stationary phase 122a may be removed so that the substituted stationary phase 122b may have pores corresponding to the polymeric stationary phase 122a.

The substituted stationary phase 122b may include various materials depending on a purpose. For example, the substituted stationary phase 122b may include a ceramic or a metal. For example, the ceramic may include cerium oxide ($CeO_2$), aluminum oxide ($Al_2O_3$), titanium oxide ($TiO_2$), zirconium oxide ($ZrO_2$), zinc oxide (ZnO) and titanium nitride (TiN) or a combination thereof. The metal may include gold, silver, platinum, palladium, ruthenium, rhodium, iridium, vanadium, nickel, cobalt, copper, tungsten, molybdenum, manganese, aluminum, iron or a combination thereof.

The substituted stationary phase 122b may be formed by various methods. For example, the substituted stationary phase 122b may be formed by chemical vaporization deposition, atomic layer deposition, electro-plating, non-electrolyte plate, metal-melted infiltration or the like.

In an example embodiment, the substituted stationary phase 122b may include a ceramic such as aluminum oxide, and may be formed by atomic layer deposition. For example, a precursor such as diethyl zinc, $H_2O$, ammonia, tetrakis (dimethylamido)titanium (IV) (TDMAT), trimethyl aluminum (TMA) or the like may be used. However, example embodiments of the invention are not limited thereto, and various precursors known to be proper for a target material may be used. For example, the atomic layer deposition may be repeatedly performed with 100 to 1,000 cycles depending on a desired thickness at 40 to 100° C. The stationary phase with a three-dimensional nano-structure including a ceramic may have a high stability against to heat and temperature variance.

In an example embodiment, the substituted stationary phase 122b may entirely fill the pores of the polymeric stationary phase 122a to have an inverse shape of the polymeric stationary phase 122a. However, example embodiments are not limited thereto, and the substituted stationary phase 122b may be coated on an inner wall of the pores of the polymeric stationary phase 122a with a thin film shape thereby forming a nano-shell structure.

The polymeric stationary phase 122a used as a template may be removed by heat treatment, supersonic treatment using an organic solvent, plasma-etching, wet etching or the like. For example, a temperature in the heat treatment may be elevated by 1 to 5° C./min, and the heat treatment may be performed at 200 to 600° C. for at least 10 minutes to remove the polymeric stationary phase 122a. When a speed for elevating the temperature is excessively large, the polymeric stationary phase 122a may be deformed thereby causing damage to a three-dimensional structure of the substituted stationary phase 122b In an example embodiment, a reaction-activating material may be further provided on a surface of the polymeric stationary phase 122a or the substituted stationary phase 122b. The reaction-activating material may be provided to increase reactivity or absorption to a target sample thereby improving separation performance. For example, the reaction-activating material may be coated on the surface of the polymeric stationary phase 122a and the substituted stationary phase 122b by a solution process.

Various materials may be used for the reaction-activating material depending on a detection target. For example, when the detection target is a material (e.g., cocaine, heroin, morphine, methamphetamine, ecstasy, ketamine, etc.) containing a functional group of a H-bond acceptor (represented in dotted lines) as represented by the following Chemical Formula 1-1, a material containing a functional group of a H-bond donor as represented by the following Chemical Formula 1-2 may be used as the reaction-activating material.

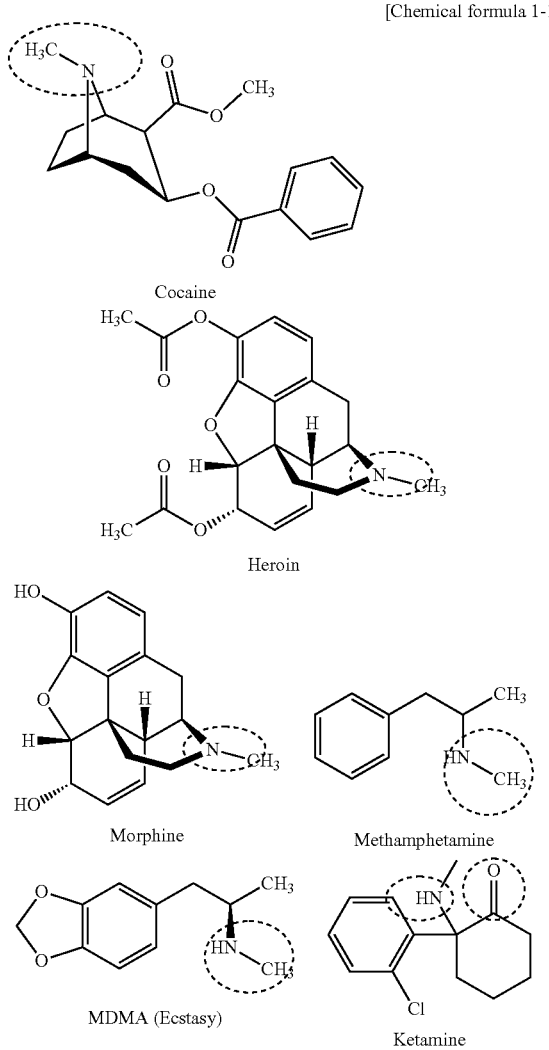

[Chemical formula 1-1]

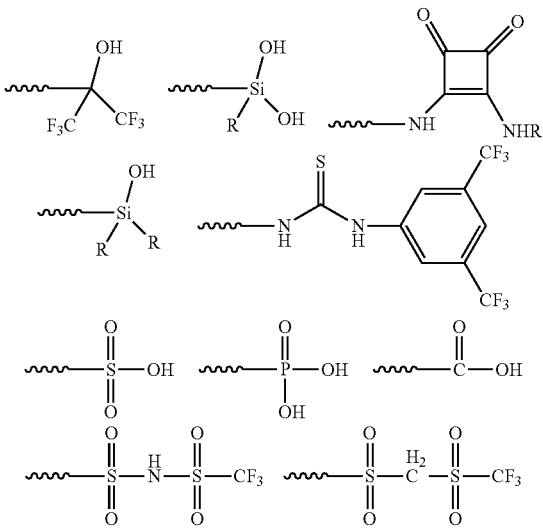

[Chemical formula 1-2]

Further, when the detection target is a material (e.g., LSD, marihuana, morphine, etc.) containing a functional group of a charge-transfer donor (represented in dotted lines) as represented by the following Chemical Formula 2-1, a material containing a functional group of a charge-transfer acceptor as represented by the following Chemical Formula 2-2 may be used as the reaction-activating material.

[Chemical formula 2-1]

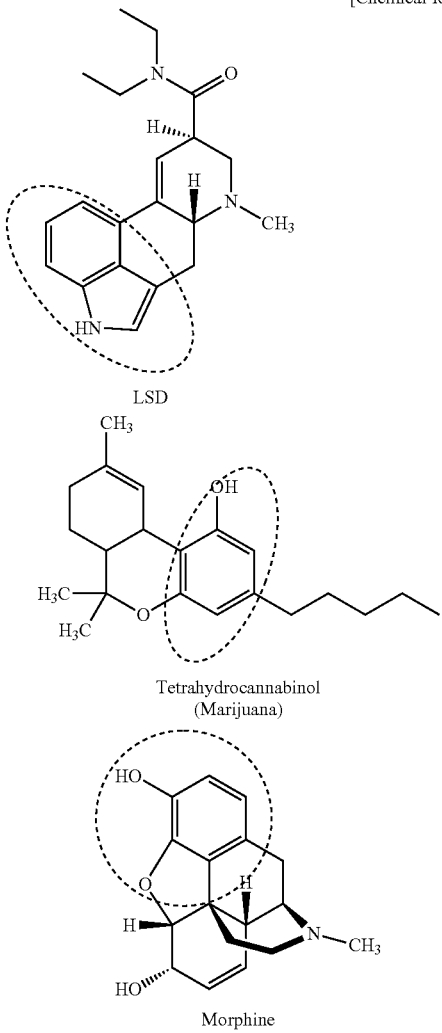

[Chemical formula 2-2]

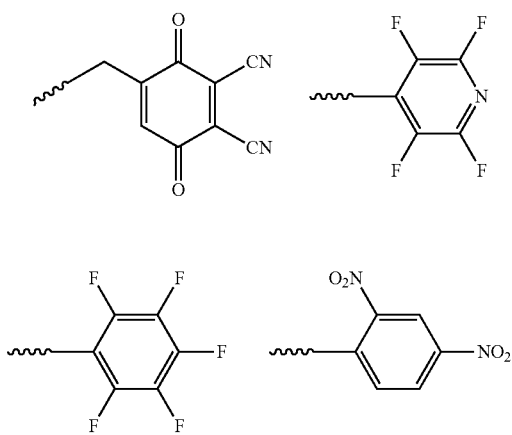

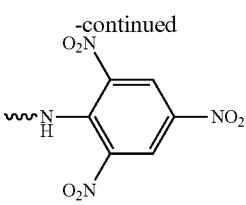

-continued

Various known materials containing the functional groups represented by the above Chemical Formulas 1-2 or 2-2 may be used as the reaction-activating material.

After the polymeric stationary phase 122a or the substituted stationary phase 122b is formed, a cover member 150 is combined on the base substrate 110.

The cover member 150 may include a material same as or similar to the base substrate 110, for example, silicon, glass, quartz, sapphire, a polymer, a metal or the like. The base substrate 110 and the cover member 150 may be bonded to each other by a known wafer-bonding method such as anodic bonding, crystal bonding, melting, an adhesive or the like. In an example embodiment, the base substrate 110 may include silicon, and the cover member 150 may include glass.

Figure 8:
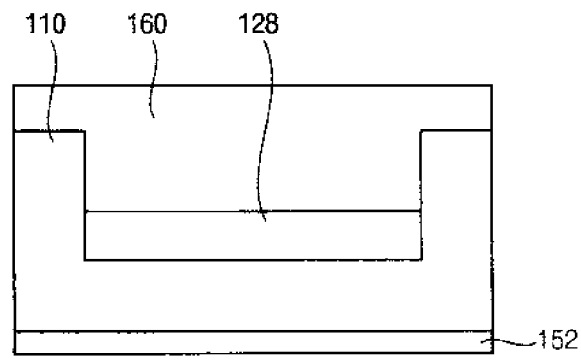
FIGS. 8 to 10 are cross-sectional views illustrating a method of manufacturing a micro-separator for gas chromatography according to an example embodiment of the invention.
Figure 9:
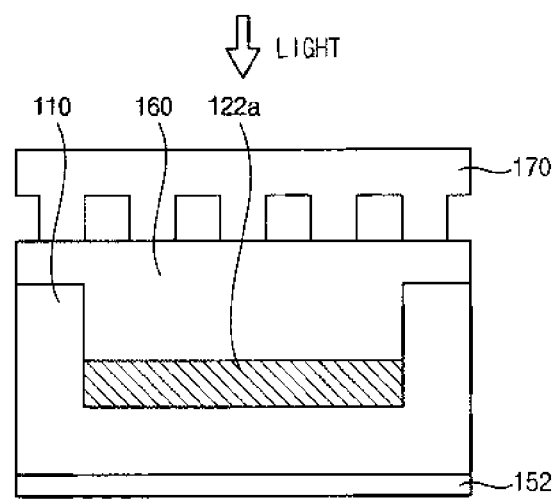
Figure 10:
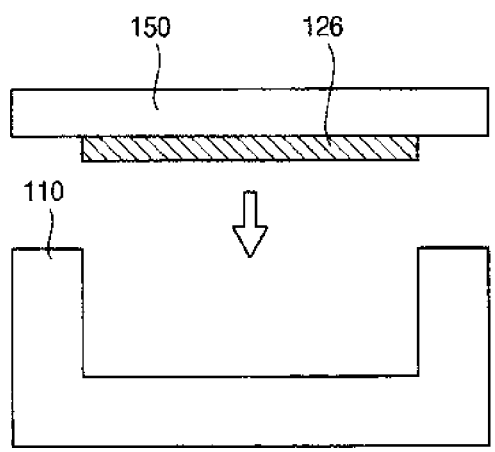

FIGS. 8 to 10 are cross-sectional views illustrating a method of manufacturing a micro-separator for gas chromatography according to an example embodiment of the invention.

Referring to FIG. 8, an optical medium member 160 may be provided on a photosensitive film 128 disposed in a trench. The optical medium member 160 may effetely transmit a light to the photosensitive film 128 in a PnP process.

As described above, an upper face of the photosensitive film 128 is lower than an upper face of the base substrate 120 so that an empty space in which a stationary phase is not disposed may be formed in a channel column with a capillary type. In this case, a gap may be generated between the photosensitive film 128 and a phase mask even though the phase mask is tightly attached to the base substrate 110. Thus, patterning uniformity may be deteriorated. Furthermore, while a PnP process is performed using light exposure through a lower surface in FIG. 4, when a member having a low transparency such as a metal film or a heating member 152 is disposed on a rear surface of the base substrate 110 as illustrated in FIG. 8, using light exposure through a lower surface is difficult.

In an example embodiment, in order to overcome patterning failures and limitations of rear-through light exposure, the optical medium member 160 may be provided between the phase mask and the photosensitive film 128 so that patterning may be uniformly performed. Furthermore, patterning uniformity may be further improved by light reflection by a metal thin film disposed thereunder.

In an example embodiment, the optical medium member 160 may include a polymer film including a polymer. Preferably, the optical medium member 160 may include a same polymer as the phase mask, and may include, for example, PDMS (ploydimetylsiloxane), PUA (polyurethane acrylate), PFPE (perfluoropolyether) or the like. In order to form the optical medium member 160, a polymer composition including the polymer or a monomer composition may be coated on the photosensitive film 128, and then may be dried or cured.

In another example embodiment, the optical medium member 160 may include glass. For example, the optical medium member 160 may include a protrusion corresponding to the trench, and the protrusion may be aligned to be inserted into the trench. Since glass has a refractive index (1.46 or more) greater than that of PDMS (a refractive index: 1.45), the optical medium member 160 may have a refractive index more similar to that of the photosensitive film 128 (a refractive index: for example, 1.65 to 1.7, and 1.67 for Su-8 (trade name)). Therefore, a three-dimensionally distributed light may be more effectively transferred to the photosensitive film 128 than for a case using PDMS. Preferably, soda lime glass having a refractive index greater than a general glass may be used for the optical medium member 160.

In another example embodiment, the optical medium member 160 may include a lubricant for matching a refractive index. The lubricant for matching a refractive index may be a liquid mixture, and may be provided to fill the trench.

Referring to FIG. 9, a PnP process is performed to form a polymeric stationary phase 122a. In an example embodiment, a phase mask 170 may contact an upper surface of the optical medium member 160, and then a three-dimensionally distributed light may be irradiated onto the photosensitive film 128 through the phase mask 170 and the optical medium member 160 to form the polymeric stationary phase 122a.

In an example embodiment, a stationary phase of a micro-separator of the invention may not be formed in a trench of a base substrate, but formed on a cover member. For example, as illustrated in FIG. 10, after a stationary phase 126 with a three-dimensional nano-structure is formed as a pattern on a surface of a cover member 150, the cover member 150 may be combined with a base substrate 110 such that the stationary phase 126 is inserted into a trench of the base substrate 110.

Figure 11:
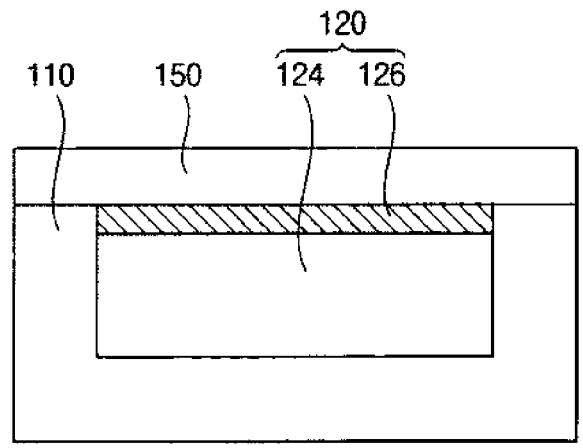
FIGS. 11 to 14 are cross-sectional views illustrating a micro-separator for gas chromatography according to an example embodiment of the invention.

Referring to FIG. 11, a stationary phase 126 may be combined with a lower surface of a cover member 150, and a gas flow path 124 may be defined between the stationary phase 126 and a bottom surface of a trench.

Figure 12:
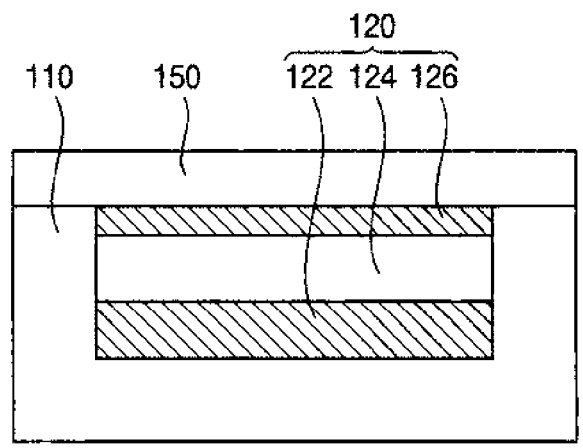
Figure 13:
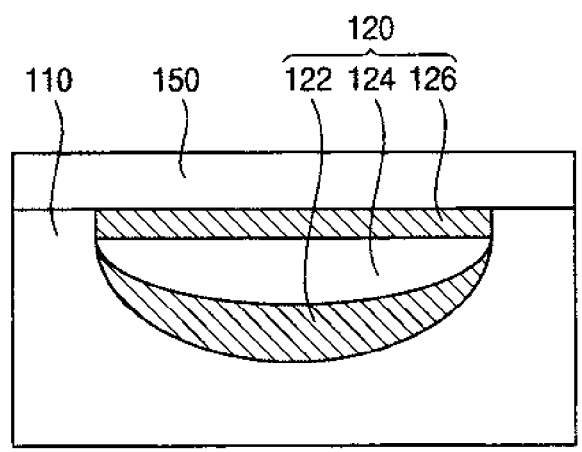

FIGS. 12 and 13 illustrate example embodiments for increasing a contact area between a stationary phase and a sample in a channel column.

Referring to FIG. 12, a lower stationary phase 122 is disposed on a bottom surface of a trench of a base substrate 110. An upper stationary phase 126 is disposed on a lower surface of a cover member 150. A gas flow path 124 is defined between the lower stationary phase 122 and the upper stationary phase 126.

Referring to FIG. 13, a trench of a base substrate 110 may have a cross-section with a concave shape. For example, the trench may have a cross-section with a semicircular shape a triangular shape.

When wettability of a photosensitive composition to the base substrate 110 is increased (for example, a hydrophilic solvent may be used) with the above structure, a lower stationary phase 122 formed in the trench may have relatively conformal shape to have a concave upper surface thereby increasing a contact area with a sample. Furthermore, an upper stationary phase 126 may be further disposed on a lower surface of the cover member 150 so that gas flow path 124 may be defined between the lower stationary phase 122 and the upper stationary phase 126.

A micro-separator including a stationary phase with a three-dimensional nano-structure according to an example embodiment may be used for a capillary column type including a gas flow path as explained in the above. However, example embodiments are not limited thereto, and may be used for a packed column type.

Figure 14:
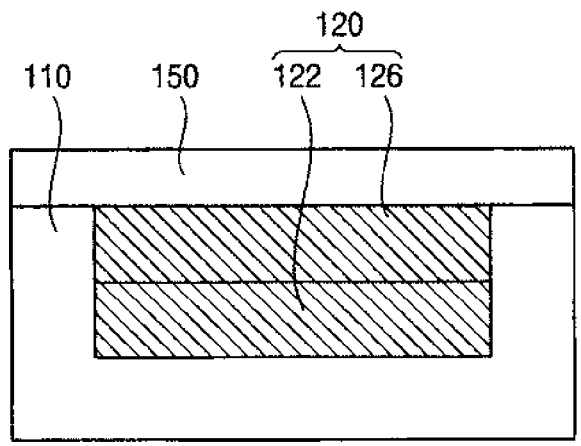

For example, referring to FIG. 14, a micro-separator includes a column channel 120 disposed in a trench of a base substrate 110, and the column channel 120 may be entirely filled with a stationary phase. For example, after a lower stationary phase 122 is formed on a bottom surface of the trench of the base substrate 110, an upper stationary phase 126 formed on a surface of a cover member 150, as illustrated in FIG. 10, may be inserted in the trench to obtain the channel column 120 entirely filled with a stationary phase. When a PnP process is used for forming a stationary phase with a three-dimensional nano-structure, it may be difficult to form a stationary phase entirely filling the trench due to light absorption of a photoresist. According to the example embodiment, the lower stationary phase 122 formed in the trench of the base substrate 110 may be assembled with the upper stationary phase 126 formed on the surface of the cover member 150 so that a stationary phase having an enough thickness to fill the trench may be obtained.

Furthermore, the stationary phase with a three-dimensional nano-structure includes pores ordered and three-dimensionally connected to each other. Thus, a sample may easily move even in a packed column type.

Figure 15:
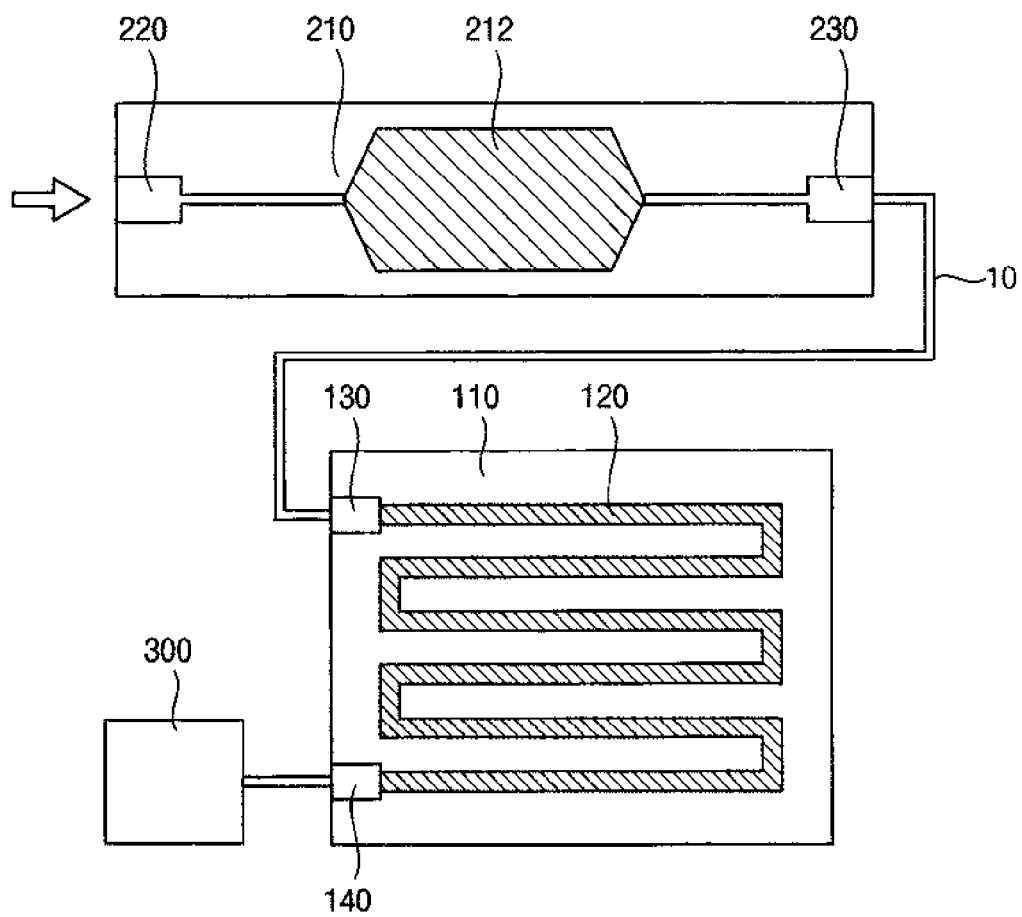
FIG. 15 is a plan view illustrating a gas chromatography system according to an example embodiment.

FIG. 15 is a plan view illustrating a gas chromatography system according to an example embodiment.

Referring to FIG. 15, a gas chromatography system according to an example embodiment includes a pre-concentrator, a micro-separator and a sensor. The pre-concentrator may concentrate a gaseous sample to provide a concentrated sample to the micro-separator. The micro-separator may separate the sample into a plurality of components and may sequentially provide the components to the sensor. The sensor may detect a kind and a content of the components provided by the micro-separator.

The micro-separator 100 includes a channel column 120 to separate the gaseous sample. The micro-separator 100 includes a base substrate 110, and a trench is formed along a surface of the base substrate 110 to form a space for the channel column 120. Both ends of the channel column 120 may be connected to an inlet 130 to which the gaseous sample is injected, and an outlet 140 from which the separated gaseous sample is discharged, respectively. Since the micro-separator 100 has a configuration substantially same as the above-explained example embodiment, more detailed explanation will be omitted.

The pre-concentrator includes a base substrate 210 with a trench. The trench may include a concentrator 212, an inlet 220 and an outlet 230. A three-dimensional porous nano-structure is disposed in the concentrator 212. The three-dimensional porous nano-structure includes pores ordered and three-dimensionally connected to each other. The three-dimensional porous nano-structure may include various materials such as a metal, a ceramic, a semiconductor, a low molecular weight organic compound, a polymer or the like.

The gaseous sample is injected through the inlet 220 and then transferred to the concentrator 212. In an example embodiment, the gaseous sample may be injected with a proper carrier gas. The gaseous sample concentrated by absorption and separation in the concentrator 212 may be provided to the inlet 130 of the micro-separator through the outlet 230. The outlet 230 of the pre-concentrator may be connected to the inlet 130 of the micro-separator by a connection column 10 using a tube or the like.

In another example embodiment, the micro-separator and the pre-concentrator may be disposed in a same substrate. In this case, a trench formed at the substrate may be used as a connection column instead of an additional tube. As desired, a stationary phase of the micro-separator and the three-dimensional porous nano-structure of the concentrator 212 may be formed in a same process.

The three-dimensional porous nano-structure of the concentrator 212 may be formed by a same method for the stationary phase of the micro-separator, for example, by a PnP process or the like. Since the three-dimensional nano-structure has a three-dimensionally connected network structure so that the three-dimensional nano-structure may ensure uniform and rapid heat transfer and may have small weight with high porosity. Therefore, since the three-dimensional nano-structure may heat the sample with low energy and uniformly heat the sample within short time, the gaseous sample may be discharged with high density within short time. As a result, the pre-concentrator may have improved concentration performance. Furthermore, the three-dimensional nano-structure may minimize back-pressure thereof.

For example, the sensor 300 may include a photo-ionization detection sensor, which measures a voltage variation due to electrons dissociated in response to UV ray applied thereto, a flame ionization detection sensor, an electrochemical sensor, a colorimetric sensor, a surface acoustic wave sensor or the like.

Since including a pre-concentrator and a micro-separator, which includes a three-dimensional nano-structure, a gas chromatography system according to an example embodiment may be miniaturized to be applied for a portable apparatus that may be used for detection at sites. Furthermore, materials, which may not be precisely identified by conventional sensor systems, such as some drugs, explosives, volatile organic compounds, which exist with an excessively low content in the air due to a low vapor pressure at a room temperature, or the like may be detected.

Hereinafter, effects of the invention will be explained with reference to particular examples and experiments.

Example 1

After a photoresist composition (trade name: SU-8 2, manufactured by MicroChem) flew in a trench formed in a glass substrate, it was heated on a hot plate at 50° C. to 100° C. for 60 minutes. Thereafter, a phase mask formed of PDMS and having a periodic convexo-concave structure was disposed to contact a lower surface the glass substrate. The phase mask included holes arranged in a rectangular shape with a pitch of 600 nm. A light-exposure process was performed using i-line (365 nm) light source with about 20 mJ/cm$^2$.

Thereafter, a light-exposed photosensitive film was heated at 50° C. to 100° C. for 10 minutes, and then developed to form a stationary phase of a three-dimensional nano-structure.

Example 2

The glass substrate with the polymeric stationary phase of a three-dimensional nano-structure formed thereon was put into a reaction chamber. An atomic layer deposition process was performed using trimethyl aluminum as an aluminum precursor at about 80° C. (under a pressure of $10^{-3}$ Torr by 700 cycles).

Thereafter, after a chamber temperature was elevated to about 500° C. by 3° C./min, heat treatment was performed in an atmosphere of the air to remove the polymeric stationary phase thereby obtaining an aluminum oxide ($Al_2O_3$) stationary phase of a three-dimensional nano-structure in the trench.

Figure 16:
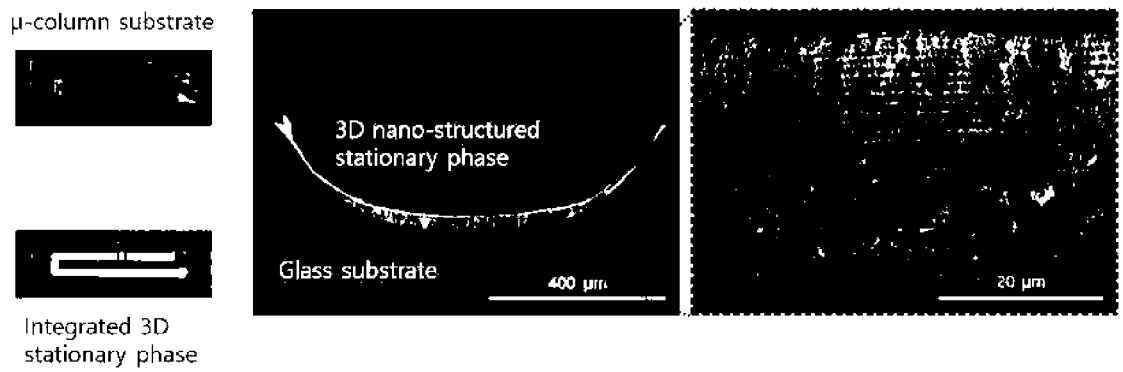
FIG. 16 shows a planar digital picture and a scanning electron microscopy (SEM) picture of the polymeric stationary phase of a three-dimensional nano-structure according to Example 1.

FIG. 16 shows a planar digital picture and a scanning electron microscopy (SEM) picture of the polymeric stationary phase of a three-dimensional nano-structure according to Example 1.

Referring to FIG. 16, it can be noted that the polymeric stationary phase of a three-dimensional nano-structure with ordered pores was formed in the trench of the glass substrate according to Example 1.

Figure 17:
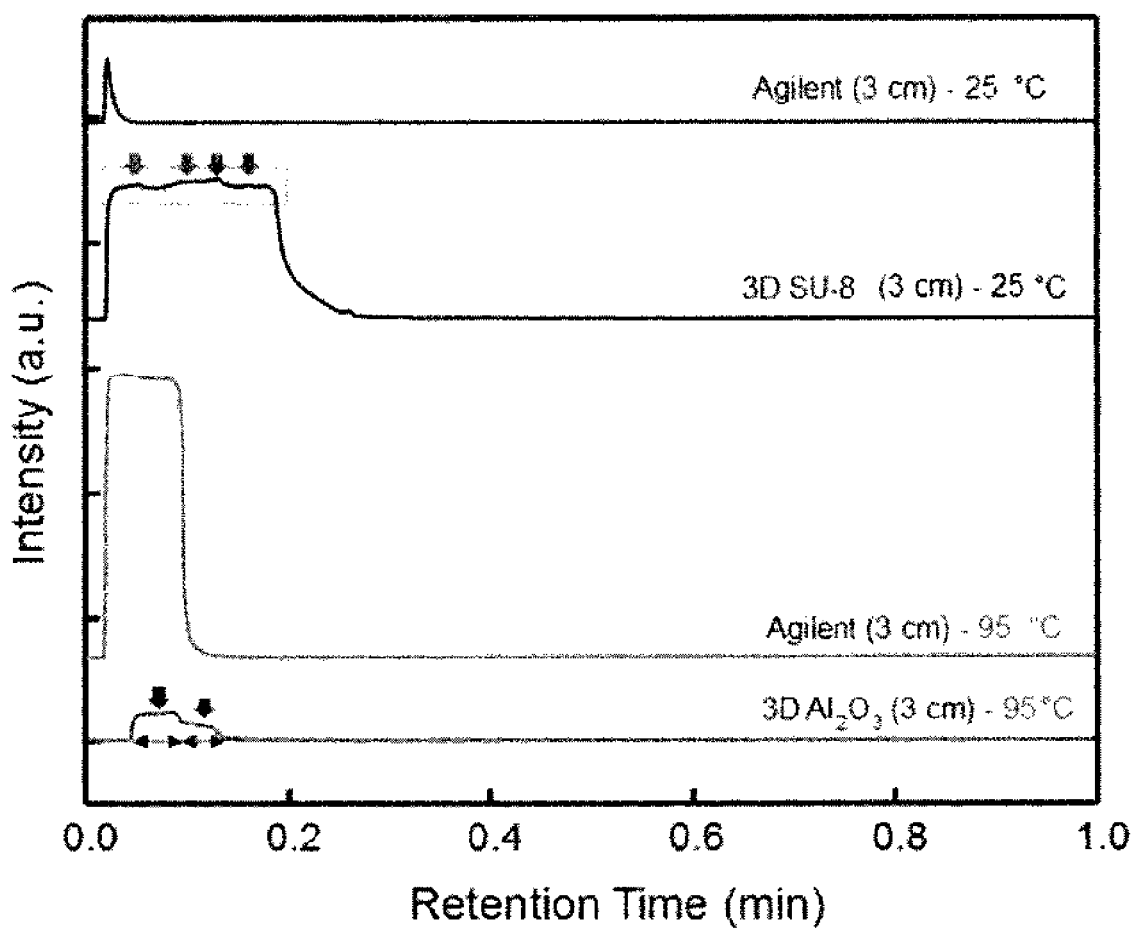
FIG. 17 is a graph illustrating results of separation tests for Example 1, Example 2 and Comparative Example 1 (Agilent J&W GC column).
Figure 18:
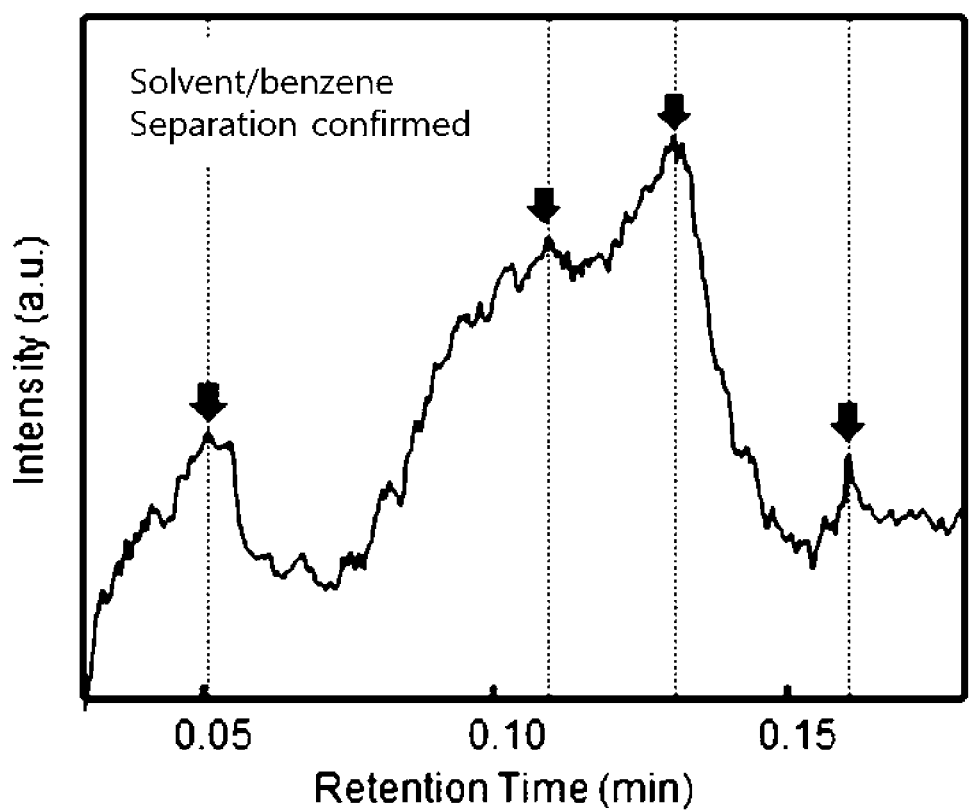
FIG. 18 is an enlarged partial graph showing results of separation tests at a room temperature for Example 1.

FIG. 17 is a graph illustrating results of separation tests for Example 1, Example 2 and Comparative Example 1 (Agilent J&W GC column). FIG. 18 is an enlarged partial graph showing results of separation tests at a room temperature for Example 1. In the experiment, methanol was used as a solvent gas, and a FID sensor was used.

Referring to FIGS. 17 and 18, while Comparative Example 1 did not show separation performance either at a room temperature (25° C.) or at a high temperature (95° C.), Example 1 (3D SU-8) using the polymeric stationary phase was able to show separation performance, and Example 2 (3D $Al_2O_3$) using the aluminum oxide stationary phase was able to show separation performance at a high temperature (separation of peaks appeared). Thus, it can be noted that a sample with a low content can be separated in a channel column having a short length (3 cm) according to example embodiments of the invention and that appliance and improved performance for a gas chromatography of the invention may be expected.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

ABILITY OF INDUSTRIAL UTILITY

A micro-separator according to example embodiments may be used for detecting various gaseous samples such as drugs, volatile organic compounds, explosive compounds or the like. For example, the micro-separator may be coupled to a sensor to be applied for a portable multi-components gaseous samples detection sensor system, which may be used for a portable micro-gas chromatography system (Portable μ-GC System), which can achieve real-time detection for multi-components at various scenes of incidence such as crime, terror or the like.

What is claimed is:

1. A method for manufacturing a micro-separator for gas chromatography, the method comprising:
   forming a photosensitive film in a trench of a base substrate;
   providing a three-dimensionally distributed light by using a phase mask to expose the photosensitive film to a light; and
   developing the light-exposed photosensitive film to form a polymeric stationary phase of a three-dimensional nano-structure having pores ordered and connected to each other, wherein the phase mask is disposed on a lower surface of the base substrate.

2. The method for manufacturing a micro-separator for gas chromatography of claim 1, wherein an optical medium member is provided on the photosensitive film, and the phase mask is disposed on the optical medium member.

3. The method for manufacturing a micro-separator for gas chromatography of claim 2, wherein at least a portion of the optical medium member is disposed in the trench, and the optical medium member includes at least one selected from the group consisting of a lubricant for matching a refractivity, glass, PDMS (polydimetyl siloxane), PUA (polyurethane acrylate) and PFPE (perfluoropolyether).

4. The method of manufacturing a micro-separator for gas chromatography of claim 1, further comprising:
    forming an upper stationary phase on a surface of the cover member, the upper stationary phase having a three-dimensional nano-structure having pores ordered and connected to each other; and
    combining the cover member with the base substrate such that the upper stationary phase is inserted into the trench of the base substrate.

5. A method for manufacturing a micro-separator for gas chromatography, the method comprising:
    forming a photosensitive film in a trench of a base substrate;
    providing a three-dimensionally distributed light by using a phase mask to expose the photosensitive film to a light;
    developing the light-exposed photosensitive film to form a polymeric stationary phase of a three-dimensional nano-structure having pores ordered and connected to each other,
    forming a substituted stationary phase filling at least a portion of the pores of the polymeric stationary phase and including a metal or a ceramic; and
    removing the polymeric stationary phase,
    wherein an optical medium member is provided on the photosensitive film, and the phase mask is disposed on the optical medium member.

* * * * *